(12) United States Patent  
Peterson

(10) Patent No.: US 11,068,819 B1  
(45) Date of Patent: Jul. 20, 2021

(54) AUTOMATED CAPACITY PLANNING IN MIXED DATA STORAGE ENVIRONMENT

(71) Applicant: EMC Corporation, Hopkinton, MA (US)

(72) Inventor: Ryan Peterson, Discovery Bay, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 1068 days.

(21) Appl. No.: 14/971,770

(22) Filed: Dec. 16, 2015

(51) Int. Cl.  
*G06Q 10/06* (2012.01)

(52) U.S. Cl.  
CPC .............................. *G06Q 10/06315* (2013.01)

(58) Field of Classification Search  
USPC ................................... 705/7.11–7.42; 710/74  
See application file for complete search history.

(56) References Cited

U.S. PATENT DOCUMENTS

| | | | | |
|---|---|---|---|---|
| 2012/0060142 A1* | 3/2012 | Fliess | ....................... | G06F 8/70 |
| | | | | 717/102 |
| 2014/0279058 A1* | 9/2014 | Mullins | .............. | G06Q 30/0276 |
| | | | | 705/14.72 |
| 2015/0039357 A1* | 2/2015 | Segal | ..................... | G06Q 10/10 |
| | | | | 705/5 |
| 2015/0143001 A1* | 5/2015 | Kuehn | .................. | G06F 3/0608 |
| | | | | 710/74 |
| 2015/0317580 A1* | 11/2015 | Glissmann-Hochstein | ................ | |
| | | | | G06Q 10/0639 |
| | | | | 705/7.38 |
| 2016/0042366 A1* | 2/2016 | Lux | ..................... | G06F 16/2228 |
| | | | | 705/7.29 |
| 2017/0109055 A1* | 4/2017 | Borowiec | .............. | G06Q 10/04 |

OTHER PUBLICATIONS

Gupta, et al., "Disk-based backup at Shoppers' Stop", Express Computer, Athena Information Solutions Pvt. Ltd. Mumbai, Jun. 14, 2011, pp. 1-3. (Year: 2011).*  
EMC Corporation, EMC VIRP Controller Automate and Simplify Storage Management, Published in the USA .Jul. 2015, Data Sheet H11750.7, https://cloudscaling.com/assets/pdf/h11750-emc-vipr-software-defined-storage-ds.pdf.

* cited by examiner

*Primary Examiner* — Amber A Misiaszek  
(74) *Attorney, Agent, or Firm* — Workman Nydegger

(57) ABSTRACT

In one example, a method for data storage capacity planning includes receiving a data metrics stream that includes information concerning a client-generated data stream, receiving information concerning a data storage capacity of the client, and analyzing the received data metrics. Based on the analysis of the data metrics and based on the information concerning the data storage capacity of the client, a projected data storage capacity requirement for the client is generated. Finally, data storage assets that correspond to the projected data storage capacity need are identified.

19 Claims, 5 Drawing Sheets

AUTOMATED CAPACITY PLANNING IN MIXED DATA STORAGE ENVIRONMENT

FIELD OF THE INVENTION

Embodiments of the present invention generally concern data backup and restoration. More particularly, at least some embodiments of the invention relate to systems, hardware, computer-readable media, and methods directed to automated storage capacity planning.

BACKGROUND

As the sophistication and power of computing systems, components and applications continues to increase, the size of files and file groups, associated with such computing systems, components and applications has correspondingly increased as well. Thus, it is important that enterprises make sure that storage capacity keeps pace with the amount of data that is to be stored, and expected to be stored in the future. For various reasons however, storage capacity planning has proven difficult to implement in practice.

At the outset, enterprises generally prefer to spend as little time as necessary on storage capacity planning. This is due in part to the fact storage capacity planning efforts are time-consuming and take personnel resources away from other enterprise functions. For example, enterprises often must put their storage hardware needs out for bid, evaluate the bids, and then select a hardware provider. This process is not necessarily viewed as adding value, but rather as placing a further burden on IT and other personnel, particularly because bid processes can be complex and extend over long periods of time.

Moreover, when enterprises do perform storage capacity planning, one problem that is often encountered is that there is a lack of adequate analytical tools to support the planning process. This makes it difficult, particularly for large enterprises with complex data storage systems and large amounts of data, to determine with an adequate degree of accuracy how much data storage will be needed for the future. Thus, estimates of future storage capacity needs are often little more than an educated guess. As a result, enterprises often miss the mark in terms of determining how much capacity is needed and, in doing so, create other problems.

For example, if an enterprise provisions too little storage capacity to suit expected future needs, the storage capacity will likely be used up sooner than expected and the enterprise will soon have to make another determination as to needed storage capacity, and then provision that storage capacity. A related concern is that storage capacity upgrades will occur relatively more frequently than would be the case if a more accurate estimate of needed storage capacity had been made initially. These frequently recurring capacity upgrades can be disruptive to system operations, and may also increase the complexity and cost of the system.

If the prior storage capacity forecast was too low, the enterprise may well err on the high side in the next planning cycle so as to avoid problems such as those just described. However, this approach is problematic as well. In particular, if the enterprise provisions more storage capacity than is likely to be needed, the enterprise has wasted money on unneeded capacity, when that money could be saved or spent on other needs. Moreover, the enterprise may lose some flexibility to respond to improvements in storage technology because it is committed to first using all the excess, older, storage capacity that was purchased.

In light of problems such as those noted above, it would be useful to provide systems, methods and devices capable of predicting data growth with an acceptable range of accuracy. It would also be useful to use data growth forecasts to provision storage capacity adequate to accommodate future needs, but without providing more, or less, storage capacity than is likely to be needed. Finally, it would be useful to be able to identify, to the enterprise, specific hardware and/or software components that would likely meet the forecasted need for data storage capacity.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1A:
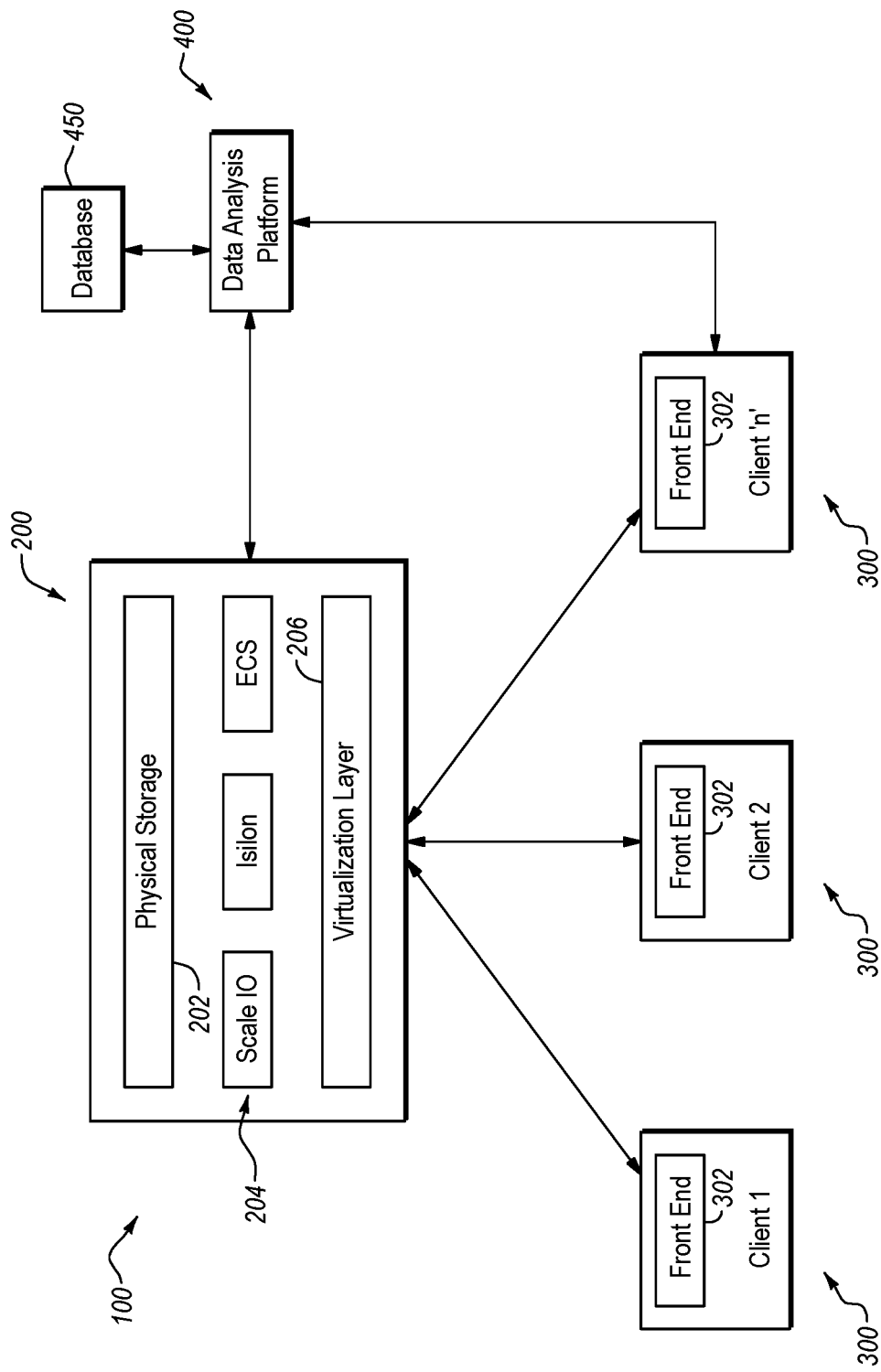
FIG. 1a is directed to aspects of an example operating environment for at least some embodiments.

Embodiments of the present invention generally concern systems, hardware, computer-readable media, and methods directed to automated storage capacity planning in a computing environment. Example storage capacity planning processes can be performed in association with data backup and restore operations. As well, storage capacity planning processes can be performed in a variety of computing environments, including mixed storage environments where blocks, files and objects are stored.

Embodiments of the invention can be employed in connection with any type of data. As used herein, the term 'data' is intended to be construed broadly and includes, by way of example and not limitation, data blocks, atomic data, chunks, segments, emails, objects, files, blocks, file structures, directories, volumes, and any group of one or more of the foregoing. The data can be of any type, and the scope of the invention is not limited to any particular type, or types, of data.

As well, it should be understood that the term 'backup,' as used herein, is intended to be broadly construed and is not limited to any particular type or form of backup. Thus, backup, as contemplated by this disclosure, embraces, but is not limited to, full backups, snapshots, incremental backups, de-duplicated backups, and any other circumstance or process where data that is desired to be protected is copied to one or more backup resources for protection.

In at least some embodiments, data from one or more clients is backed up to a storage service, which may be a cloud storage service, although that is not necessarily required. The backed up data can later be restored to one or more target clients, one of which may, or may not, be the client from which the backed up data originated. In some embodiments, the backed up data is deduplicated data, although that is not required.

A variety of information associated with backup data may be transmitted from the cloud storage service to a data analysis platform, which can also be a cloud computing entity. Such information may be referred to herein as data metrics and, as used herein, the term 'data metrics' is intended to be broad in scope. In general, the data analysis platform can analyze the data metrics to make various determinations that have implications with respect to future storage capacity needs on the part of the client, or clients, whose data is backed up at the cloud storage service. By way of example, such data metrics can include, but are not limited to, capacity and/or performance metrics such as one or more of the rate at which client data is growing, the rate at which data storage capacity is being consumed, how client data is being used, data growth rate on an application-level basis, how often particular data is used by an application, the rate at which data storage needs are increasing, and specific hardware and/or software assets that are suited to accommodate expected data storage needs for one or more clients.

In some embodiments at least, the data analysis platform can analyze data metrics on a client basis and/or across multiple clients. For example, conclusions resulting from analysis of the data metrics of one client can be applied to evaluating the performance and needs, such as for storage capacity, of another client or clients. Thus, the data analysis platform is a smart platform that is capable of learning and then applying what has been learned to subsequent analyses for the same and/or other clients.

In at least some embodiments, data metrics analysis is performed in real time, or near real time. That is, the analysis can be performed on an ongoing basis as the associated data is being backed up. As well, the analysis can be performed automatically, such as based on triggering events for example, without having been specifically initiated by a user. Examples of such triggering events include the addition and/or reduction, of data storage capacity associated with a client whose data is backed up, such as when a client brings a new storage rack online. Moreover, capabilities such as these enable on-the-fly data storage capacity planning. Thus, embodiments of the invention are able to quickly adapt to changing conditions.

In some embodiments at least, the data metrics are stored persistently in long term storage, as well as being analyzed in real-time, or near real-time. For example, the results of any analyses can be persistently stored in association with the data metrics upon which the analyses are based, and copies of the data itself can also be persistently stored with the analytical results and data metrics. Thus, an administrator or other user has access to a complete package of information that may enable, among other things, determination of historical trends relating to data metrics, such as the consumption of data storage capacity for example, and the frequency with which storage capacity has been added to the system. More generally, any data metric(s) can be evaluated both from a short term perspective, that is, over a relatively short timeframe, and from a long term perspective, that is, over a relatively longer timeframe.

Finally, embodiments of the invention embrace a user front-end graphical user interface (GUI) and associated applications that enable a user, such as an administrator for example, to define and implement capacity storage planning processes and data analysis processes. The user front-end can also be employed by the user to interface directly with an equipment manufacturer to order and provision new data storage capacity indicated to be necessary by the data analysis platform. Thus, embodiments of the invention can help to streamline, or even eliminate, cumbersome contracting processes for obtaining additional data storage capacity.

Advantageously then, embodiments of the invention provide for automated data storage capacity planning and provisioning. As well, the analyses underlying the planning and provisioning processes can be performed in near real time so that the user can have assurance that those processes are based on current information. Further, the data metrics can be persistently stored so that long term trends can be identified in the data metrics. Moreover, the user can quickly and easily obtain data storage capacity hardware and/or software that is well suited to fit with the projected needs of the user. Finally, embodiments of the invention can be employed in mixed storage environments that include block, file, and/or object storage.

A. Example Operating Environments

In general, embodiments of the invention may include and/or be implemented in an operating environment that includes various clients and/or other devices that generate and/or cause the generation of data that is desired to be backed up. Data metrics such as client performance and capacity data can be collected and logged, continuously in at least some embodiments, and backed up at a cloud storage platform, and then analyzed by a data analysis platform that may also be a cloud computing entity. Additionally, or alternatively, data storage capacity planning can be performed for the cloud storage platform. More generally, data storage capacity planning can be performed for any entity, or grouping of entities, that generate and/or cause the generation of data, as well as for any entity, or grouping of entities, where data is stored.

With the foregoing in mind, attention is directed now to FIG. 1a which discloses one example of an operating environment that may be suitable for one or more embodiments of the invention. In FIG. 1a, the example operating environment is denoted at 100 and may be a network such as a local area network, a wide area network, or any other networked configuration. Moreover, the operating environment 100, or any group of one or more of its elements, may comprise, form an element of, or constitute, a cloud computing environment. The operating environment 100 may include various devices including servers and other computers that are interconnected. The operating environment 100 may employ a variety of communication media, such as hardwire, wireless, or some combination thereof. In some instances, some or all of the operating environment 100 may comprise an optical communication network.

As indicated in FIG. 1a, the example operating environment 100 includes a cloud storage platform 200 that communicates with one or more clients 300 such that data generated by and/or at the direction of one or more applications on the clients 300 is backed up at the cloud storage platform 200. One or more clients can be located at a customer site or premises. The example operating environment 100 also includes a data analysis platform 400 that communicates with the cloud storage platform 200 and/or with one or more of the clients 300 to analyze data generated by the clients 300. The data analysis platform 400 can be a cloud computing entity that provides data analysis services to one or more nodes of one or more of the clients 300, although it is not required that the data analysis platform 400 be a cloud computing entity. In some embodiments, the cloud storage platform 200 and the data analysis platform 400 can be implemented together as a single data storage and analysis entity, although that is not required.

As shown in FIG. 1a, data metrics from each of the clients 300 can be directed to the cloud storage platform 200, although that is not necessarily required. While not specifically indicated, the data metrics can be transmitted in conjunction with, or separately from, the associated backup data. As well, the data metrics can be transmitted before, during, and/or after, transmission of the associated backup data.

With particular reference first to the cloud storage platform 200, such a platform can include, or at least access, physical storage 202 in the form of one or more physical storage nodes. One example of such a cloud storage platform in connection with which at least some embodiments could be employed is the Amazon Simple Storage Service (Amazon S3) platform, although any other cloud storage platform could be employed. Other example platforms include OpenStack Swift, EMC Corp. Atmos, Centera CAS, and Hadoop HDFS.

The physical storage 202 may comprise an element of distributed block, file, and/or object system platforms 204, examples of which may include an EMC Isilon, EMC Corp. Elastic Cloud Storage (ECS), or other storage cluster, although no particular form of implementation of the physical storage 202, or its constituent components, is required. In some embodiments at least, a single client and/or group of multiple clients may generate backup data of a variety of different types, each of which may implicate a different respective type of storage. Accordingly, data metrics can be generated on a single client basis, or multiple client basis, based upon the various different type(s) of data contained in a particular backup data stream, or backup data streams. Thus, for example, data metrics can be generated for data stored in a block storage system, data stored in a file storage system, and data stored in an object storage system.

The EMC Isilon cluster, for example, is configured to provide high-volume storage, backup and archiving of unstructured data. In brief, the EMC Isilon cluster can provide a cluster-based storage system based on industry standard hardware. In some embodiments at least, the EMC Isilon clustered storage system is composed of three or more nodes. Each node can be a self-contained, rack-mountable device that contains industry standard hardware, including disk drives, CPU, memory and network interfaces, and is integrated with an operating system software which unifies a cluster of nodes into a single shared resource. Depending upon the configuration, the Isilon hardware platform can include a variety of different nodes, such as S-Series nodes (for high-performance, process-intensive, high-transaction applications), the X-Series nodes (for high-throughput and high-concurrency application needs), the NL-Series nearline storage nodes (for archiving, disaster recovery and disk-to-disk backup needs); and, the HD-Series nodes (for large-scale, high-density deep archive storage needs, as well as disaster recovery).

With continued reference to FIG. 1a, the cloud storage platform 200 may include a virtualization layer 206 that virtualizes, or abstracts, and pools the physical storage 202 for one or more of the clients 300. Such abstraction and pooling is useful in environments where the physical storage 202 may comprise a variety of different storage resources, each with its own application program interface (API) and operating requirements. Among other things, the virtualization layer 206 may stream data metrics from one or more clients 300 to the data analysis platform 400.

In some embodiments, the virtualization layer 206 may take the form of, or include, the EMC Corp. ViPR Controller or the EMC OnRack hardware abstraction layer (HAL), although neither of these implementations is required. Among other things, the virtualization layer 206 may enable automated provisioning of storage services, while doing so in a way that is transparent to the client(s) 300. For example, the client(s) 300 may be unaware of the underlying hardware and software that is providing storage for the client 300 applications. The provisioning of storage for client 300(s) can be performed automatically by the virtualization layer 206 based on predefined policies.

With continued reference to FIG. 1a, one or more of the clients 300 may include unified customer front end 302, or simply, front end. Among other things, the front end 302, which may be implemented as software and include a graphical user interface (GUI), can enable a user to initiate and control various functions relating to backup storage of client data. Such functions can include, for example, data storage capacity planning, provisioning of data storage capacity, monitoring of parameters such as data creation rates and data storage capacity consumption rates, management of data storage, and any other desired function(s).

As further indicated in FIG. 1a, client 300 data metrics can be transmitted to the cloud storage platform 200, and then from the cloud storage platform 200, such as by way of the virtualization layer 206 for example, to the data analysis platform 400. Additionally, or alternatively, the client 300 data metrics can be transmitted from the client(s) 300 directly to the data analysis platform 400, and analyzed in real-time or near real-time as the data metrics are generated and transmitted.

Transmission of data metrics from one or more of the clients 300 to the cloud storage platform 200 and/or transmission of the data metrics from the cloud storage platform 200 to the data analysis platform 400 may be performed in real-time or near real-time by using a streaming protocol, such as Apache Kafka or NiFi for example, although other streaming protocols could alternatively be employed. In general, such streaming protocols enable data metrics to be copied and the data metrics copy, or copies, sent to one or more destinations. Thus, incoming data stream(s) from one or more nodes of one or more clients, such as clients 300, can be backed up and, simultaneously, or substantially simultaneously, the associated data metrics can be logged and transmitted to the data analysis platform 400 for analysis. In this way, the backup performance of the cloud storage platform 200 is not impaired by the operations of the data analysis platform 400.

Streaming protocols such as these can be implemented in connection with a web-based user interface and can enable dataflow to be tracked from the beginning of the stream to the end of the stream. Such streaming protocols can also enable the use of encrypted content through the use of various security standards such as SSL, SSH, and HTTPS, for example. These streaming protocols may also have low latency relative to total data throughput, and can provide for prioritization of data for streaming.

As discussed in more detail elsewhere herein, the data metrics received by the data analysis platform 400 can be analyzed by the data analysis platform 400. Results of the analysis can be stored persistently in a database 450 that is included in, or accessible by, the data analysis platform 400. The data analysis platform 400 can also respond to data calls from clients 300 and provide data analysis results to the requestor(s) in response to those data calls.

B. Example Host Configuration

Figure 1B:
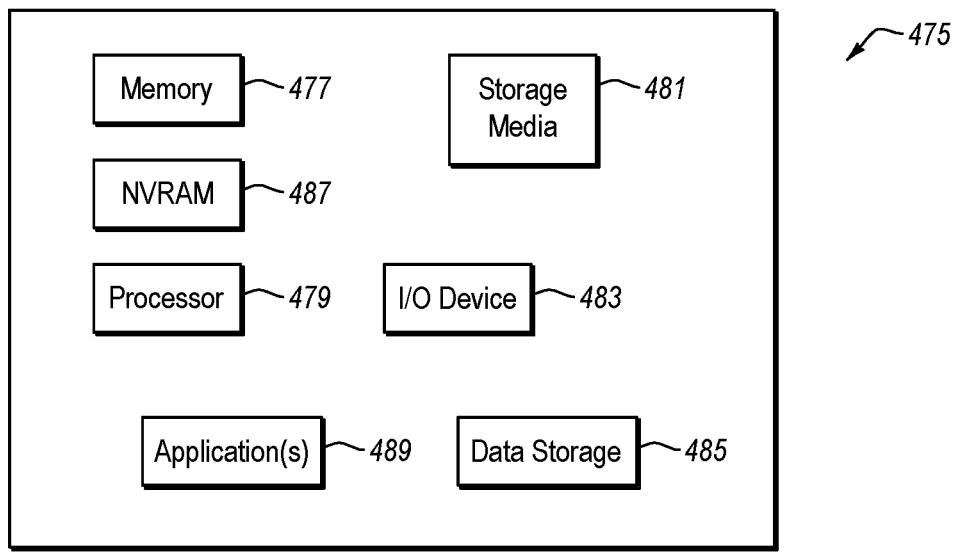
FIG. 1b is directed to aspects of an example computing system.

With reference briefly to FIG. 1b, one or more of the cloud storage platform 200/700, clients 300/600, and data analysis platform 400/800, can comprise or take the form of a physical computing device, one example of which is denoted at 475. In the example of FIG. 1b, the computing device 475 includes a memory 477, one or more hardware processors 479, non-transitory storage media 481, I/O device 483, data storage 485, and NVRAM 487. As well, one or more applications 489 are provided that comprise executable instructions. Such executable instructions can take the form, for example, of any one or more of a backup application, a backup client, a deduplication application, one or more data analysis applications, a data streaming application, an inventory management application, applications for block, file or object storage, and applications for storage asset provisioning, data security, data monitoring, data storage capacity planning, data protection, and data management.

C. Example Storage Management Platform

Figure 2:
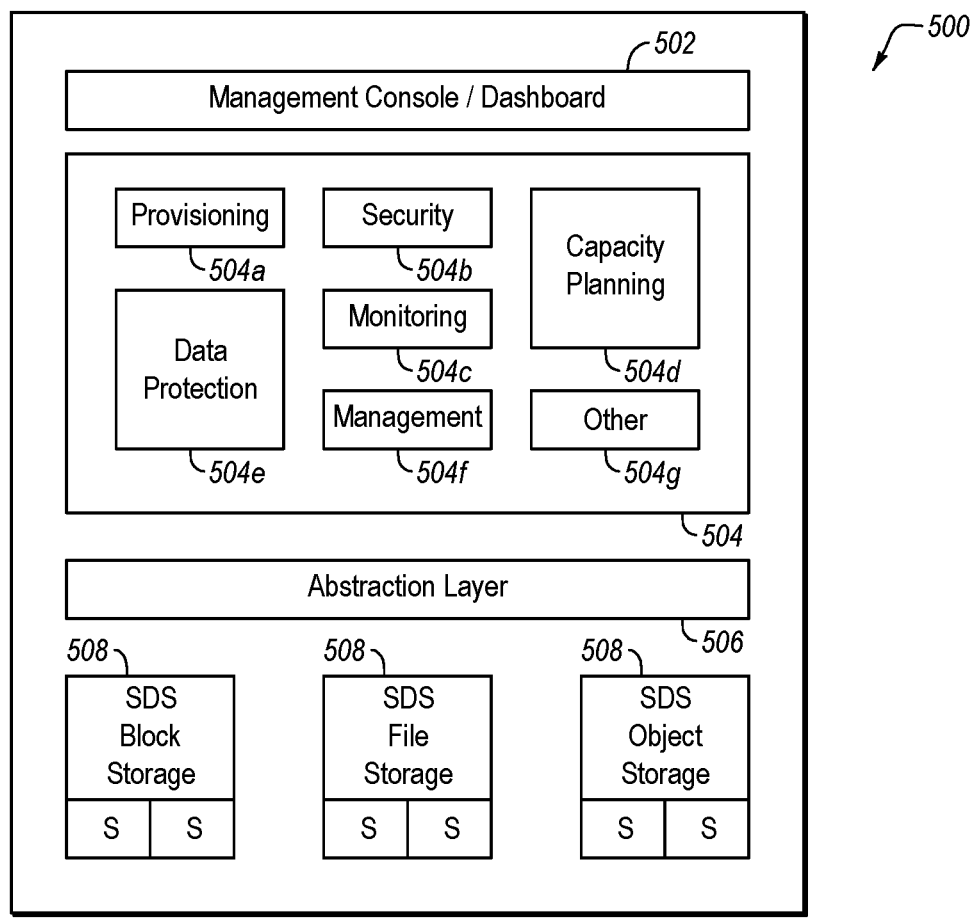
FIG. 2 is directed to aspects of an example storage management platform.

With continued attention to FIGS. 1a and 1b, and directing attention now to FIG. 2 as well, details are provided concerning a storage management platform, one example of which is denoted generally at 500. As discussed below, the storage management platform 500 may include various entities and components of the example operating environment 100 discussed in connection with FIG. 1a.

The storage management platform 500 can include a management console/dashboard 502 which can be displayed by way of a GUI at a client such as client 300. The management console/dashboard 502 enables a user to access a variety of functions 504 pertaining to data backup and management processes and hardware. Such functions can include, but are not limited to, hardware provisioning 504a, data security 504b, monitoring 504c, storage capacity planning 504d, data protection 504e, management 504f, and any other function(s) 504g relating to data backup and management processes and hardware.

In some embodiments, an abstraction layer 506 can be an element of the storage management platform 500. Further details concerning some aspects of example abstraction layers are discussed above in connection with FIG. 1a. The abstraction layer 506 can interact with one or more types of software-defined storage (SDS) platforms 508, examples of which include distributed filesystem, block, and object storage. In the example of FIG. 2, the storage platforms 508 are elements of the storage management platform 500. One or more of the storage platforms 508 may include one or more hardware servers 'S.'

As is apparent from the preceding discussion, embodiments of the storage management platform implement an integrated approach to the analysis of client data metrics and management of data storage assets. For example, the storage management platform integrates a user interface, management functions, filesystem platforms and data storage assets.

D. Example Client Configuration

Figure 3:
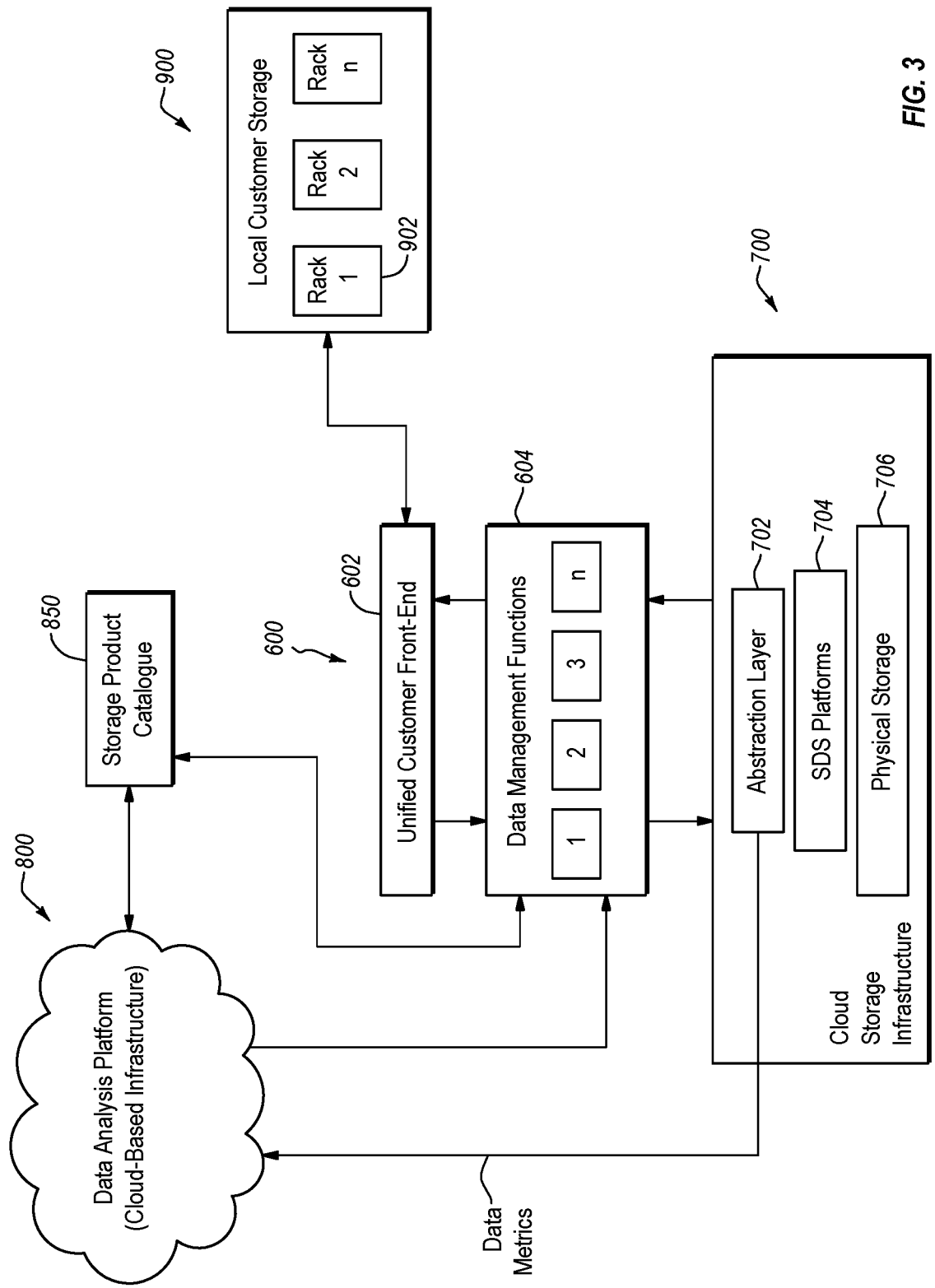
FIG. 3 is directed to aspects of an example client configuration as it relates to a data analysis platform.

With reference now to FIG. 3, details are provided concerning an example client configuration, and various example associated entities. The client may take the form of client 300 (FIG. 1a), although that is not required. Moreover, the client may include or be associated with one or more storage nodes. The arrangement indicated in FIG. 3 can be considered as providing a data storage and analysis Infrastructure As A Service (IAAS), although that is not intended to limit the scope of the invention in any way.

As shown in FIG. 3, a client 600 such as a client may include a unified customer front end 602 that provides an interface to a variety of data management functions 604, some or all of which can be initiated by a user at the client 600. Some example data management functions are referred to at 504 in FIG. 2. The unified customer front end 602 may comprise, or be an element of, a graphical user interface (GUI). While the unified customer front end 602 can be accessed at the client 600, use of the unified customer front end 602 is not limited to the client 600. Thus, in some embodiments at least, the unified customer front end 602 can be viewed on any device(s), at any location(s) and at any time(s). Among other things then, this extensibility of the unified customer front end 602 enables a high level of accessibility to the data management functions 604.

As further indicated in FIG. 3, and noted earlier in the discussion of FIG. 1a, one or more clients 600 can communicate with a cloud storage infrastructure 700. The cloud storage infrastructure 700 can include, for example, an abstraction layer 702 with which the unified customer front end 602 of the client 600 interfaces. The abstraction layer 702 can provide a representation of SDS block, file, and/or object system platforms 704 and/or physical storage 706 to the unified customer front end 602.

Another function of the abstraction layer 702, in some embodiments at least, is to provide the data metrics to a data analysis platform 800. Some example data streaming protocols that can be used for this process are addressed in the discussion of FIG. 1a above. The data analysis platform 800 can be associated with, or include, a storage product catalogue 850, which may also be directly accessible by the client 600. The storage product catalogue 850 can include a variety of stock keeping units (SKU) that correspond with respective storage assets available for purchase by a customer. Thus, the results of analyses performed by the data analysis platform 800 can be correlated to particular storage assets, identified in and available through the storage product catalogue 850, that have been determined to satisfy projected future storage needs of the client 600.

With continued reference now to FIG. 3, the backup data to which the data metrics pertain can be customer data backed up from local customer storage 900 to the cloud storage infrastructure 700. The local customer storage 900 can be located at the client 600 or at another location. The data stored at the local customer storage 900 may include any one or more of blocks, files, and objects. In the illustrated example, the local customer storage 900 includes one or more racks 902, although other data storage systems and equipment could additionally or alternatively be used.

E. Example Methods for Automated Capacity Planning

Figure 4:
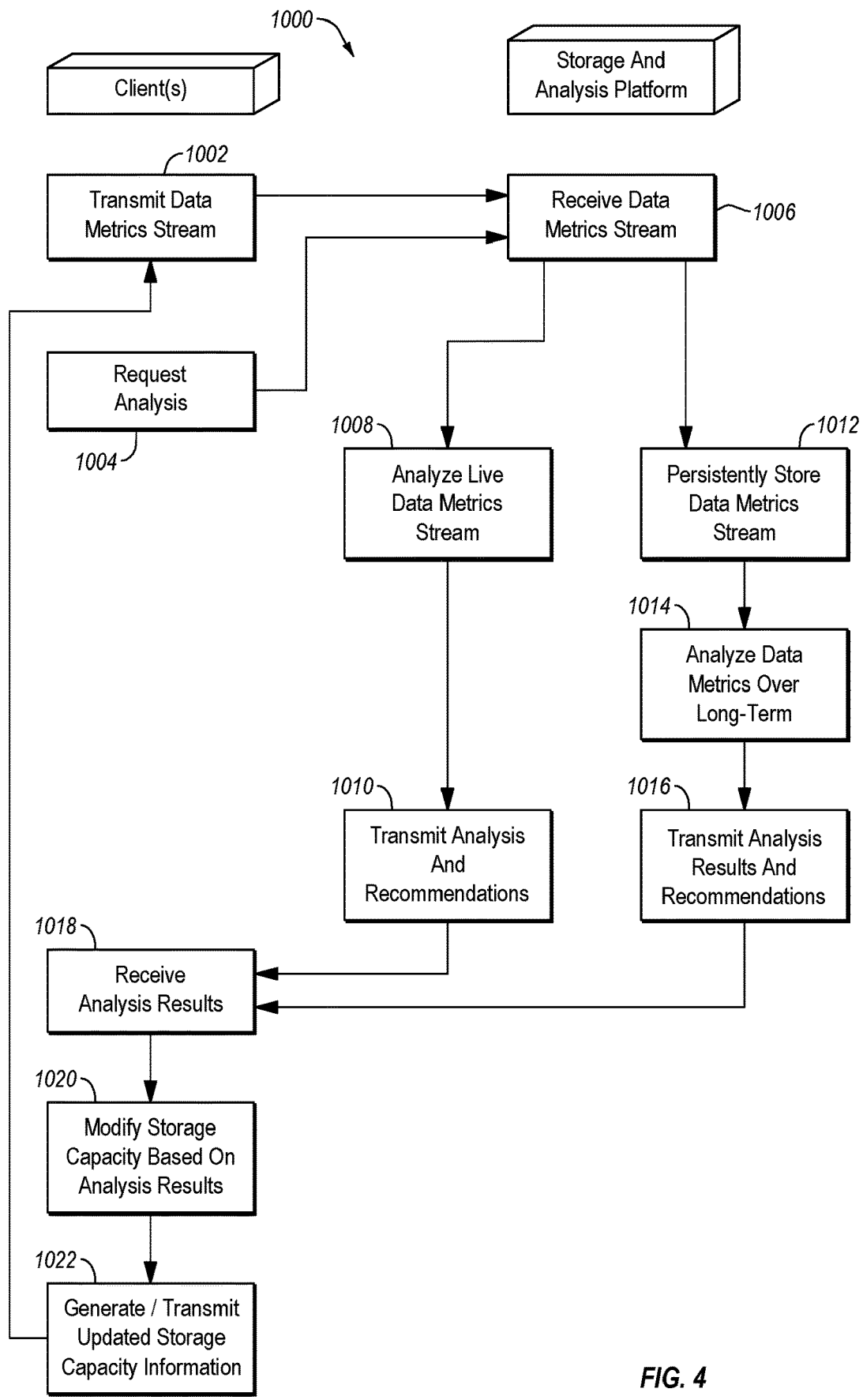
FIG. 4 is directed to aspects of example methods for data storage capacity planning.

With the discussion of FIGS. 1a-3 in view, and directing attention now to FIG. 4, details are provided concerning methods for automated capacity planning, one example of which is denoted generally at 1000. As indicated in FIG. 4, various entities may be involved with part or all of the method 1000. For example, a client, node, cloud storage platform, and data analysis platform may individually and/or cooperatively perform a variety of functions. However, the allocation of functionalities indicated in FIG. 4 is provided only by way of example and, in alternate embodiments, one or more of those functionalities can be allocated differently, eliminated, or combined with one or more other functionalities. Accordingly, the scope of the invention is not intended to be limited by the example of FIG. 4.

As well, in some embodiments, a storage entity and data analysis platform can be combined together as a single entity. The storage entity can be a public or private storage entity, and can be a cloud storage platform or an on-premises storage entity. More generally however, the scope of the invention is not limited to any particular type or location of storage entity.

Finally, it should be noted that while one of the entities in FIG. 4 is denoted nominally as 'client,' the client of FIG. 4 broadly embraces any entity, or group of entities, that generates, causes the generation of, and/or stores, data. Thus, the processes disclosed by FIG. 4 are not intended to be limited to any particular arrangement or configuration of entities.

With particular reference now to the method 1000, one or more nodes can stream 1002 respective data metrics to a storage and analysis platform for backup. The data metrics can include any combination of the data metrics information disclosed herein and/or data metrics that would be apparent to a person of ordinary skill in the art having the benefit of this disclosure. The backup, or backups, to which the data metrics pertain can include deduplicated data, although that is not required. As well, the backup can include a variety of data forms and types, examples of which include blocks, files, and objects. The data included in the backup can be taken from a single data storage asset, such as a rack for example, at the client, or the backup data can span multiple different storage assets, each of which can include one or more nodes. Finally, the backup data can span an entire enterprise, or something less than an entire enterprise.

Before, simultaneously, or after, the data metrics are provided from the node(s) of the client to the storage and analysis platform, a user at the client can also request 1004, such as by way of a unified customer front end for example, that an analysis of the data metrics be performed. This request can be transmitted from the node(s) of the client to the storage and analysis platform. In some embodiments, the request for analysis 1004 is generated automatically, for example, whenever data metrics are streamed to the cloud storage service for backup and/or at any other time(s). More generally, such requests can be generated automatically in response to the occurrence, or non-occurrence, of a particular event, and/or based on the passage of a particular period of time, or on a calendar basis, to name a few examples.

Both the data metrics and the request for analysis are received 1006, though not necessarily contemporaneously, at the storage and analysis platform. The storage and analysis platform can then analyze 1008 the data metrics stream. In at least some embodiments, the data metrics can be analyzed 1008 in real-time, or near real-time, that is, as the original data stream comes into the cloud storage service from the originating node(s). In conjunction with the analysis, the data analysis platform can also generate recommendations relating to the results of the analysis. The analysis and recommendations can then be transmitted 1010 to the client whose data was the subject of the analysis and/or transmitted to any other entity.

In addition to analyzing the live data metrics stream, the storage and analysis platform can also persistently store 1012 a copy of the data metrics stream. Thus, the storage and analysis platform can analyze 1014 any long term changes that are reflected in the stored data metrics. For example, the storage and analysis platform may analyze the stored data metrics to identify longer term trends in data storage consumption, data growth. Because the data metrics are persistently stored, such analyses can be performed one or more times. Moreover, the analyses can be performed at any time, whether automatically according to a schedule or in response to the occurrence or non-occurrence of an event, or at the initiative of a user. As noted earlier, the results of such analyses and/or the backup data upon which the data metrics are based, can also be persistently stored in association with the data metrics. In any case, the results of any analyses performed 1014 can be transmitted 1016 to the client whose data was the subject of the analyses and/or transmitted to any other entity.

The client and/or other entity receives 1018 the results of the analysis of the live data metrics stream and/or the results of the analysis of the stored data metrics. With this information, the client can then implement modifications 1020 to the associated storage capacity, based upon the analysis and recommendations. In some instances, the modifications to the storage capacity associated with the client can be implemented automatically. Information concerning the updated storage capacity can then be generated 1022 and retained at the client and/or elsewhere, for inclusion in another data metrics stream, or streams.

With continued reference to FIG. 4, further details are now provided concerning the collection of information, performance of data metrics analysis, the generation of results and recommendations, and the use of such information as a basis for data storage capacity planning and modification.

The data metrics collection processes can include the collection, such as by the storage and analysis platform, of a wide variety of information concerning the data of one or more clients or customers, and these processes can then use that information to enable automated storage capacity planning for the one or more clients or customers. The data metrics can be collected on any number of bases including, for example, one or more of continuously, automatically, on the initiative of a customer, on an ad-hoc basis, and/or at one or more scheduled times.

At the individual customer level, the data metrics can be obtained at a variety of levels of granularity, ranging from a single application to enterprise-wide, and/or can also be specific to a particular data storage asset such as a rack, or multiple/all client data storage assets, including mixed data storage assets. Examples of such data metrics include, but are not limited to: the rate at which the volume of client data is growing, or decreasing; the rate at which client data storage capacity is being consumed, or freed; how and when client data is being used; how often client data, or subsets of client data, are being used; the types of client data being generated; the mix of data storage types—for example, block, file, and object; how quickly or slowly data is being stored; how often data is stored; parameters relating to movement of data between and among client storage assets, such as the type and amount of data, when the data was moved, and the source and destination of that data; and, various operational parameters, including but not limited to, input/output operations per second (TOPS).

Data metrics such as those noted above can also be collected and/or analyzed on an aggregated basis that spans multiple customers or clients, each of which may be associated with a different respective enterprise. For example, data metrics can be collected for multiple customers of a cloud-based storage service, and the data storage capacity of the cloud-based storage service can then be planned based on an analysis of the information that has been collected for all of the users. Thus, storage capacity planning can take place at an individual customer level, and/or across multiple customers.

Once the data metrics concerning the data of one or more clients or customers has been collected, the collected data metrics are analyzed and various determinations can be made based on the analysis of the data metrics. Such determinations can be made on an individual customer basis and/or across multiple customers. As well, these determinations can be made on any number of bases including one or more of continuously, automatically, on the initiative of a customer, on an ad-hoc basis, and/or at one or more scheduled times. Examples of such determinations include, but are not limited to: the expected useful life of the current client data storage capacity; and, projected future client needs for data storage capacity.

In some embodiments, an analysis performed for one client can be used as a basis for generating recommendations for one or more other clients as well. For example, if a client of a cloud storage service decides to add 1000 new email users, the impact of that change can be evaluated at the data analysis platform, and the results of the analysis applied the next time another client makes a similar change. Thus, the data analysis platform is able to learn from one or more analyses performed and then apply the lessons learned to circumstances that may arise in the future for the same and/or other clients. This learning approach can reduce the time required to perform analyses when those analyses are based in whole or in part on analyses previously performed.

After the data metrics have been analyzed, various courses of action and recommendations can be generated based on the results of the analysis. For example, recommendations for additional storage capacity can be generated based on projected future storage capacity needs. These recommendations can be transmitted to the client whose node(s) generated the data upon which the data metrics analysis was based, and such recommendations may include multiple storage equipment options from which a user can select. The storage equipment options can be based on considerations such as cost, expected life of the recommended storage capacity, and, lead time for the recommended equipment. The client can also be provided with access to a vendor catalogue such that, upon selection of a storage equipment option, a user at the client is presented with a link or other mechanism that enables the user to order the selected equipment from a vendor.

In some embodiments, a storage product catalogue can include a variety of SKUs that correspond with respective storage assets available for purchase by a customer. Thus, the results of analyses performed by the storage and analysis platform can be correlated to particular storage assets, identified in, and available through, the storage product catalogue, that have been determined to satisfy projected future storage needs of the customer.

After the customer has obtained additional storage capacity, the storage and analysis platform can account for the implementation of that additional storage capacity. For a new data storage rack for example, the user can enter identifying information, such as the Rack ID, through the unified customer front end, and this information can be conveyed to the cloud storage platform which, in turn, relays the information to the data analysis platform. The Rack ID for the new data storage asset can then be displayed to the user by way of a GUI, and the user can receive a message by way of the GUI and/or email for example, that the new data storage asset has been provisioned.

At this point, the storage and analysis platform can begin to collect data metrics from the new data storage asset. One, some, or all of the aforementioned processes, beginning with entry of the Rack ID, can be performed automatically. Similar processes can be performed, automatically in some embodiments, when a storage asset is taken off line by the user, and/or when the data associated with that storage asset transferred to one or more other storage assets. When a user takes a storage asset offline, the user can also specify, such as by way of a GUI, one or more target destinations for the data residing on that data storage asset. Thus, the storage and analysis platform can react quickly and automatically to detected changes in the data storage capacity of one or more clients, and to detected data migration within a client.

F. Example User Interface

Figure 5:
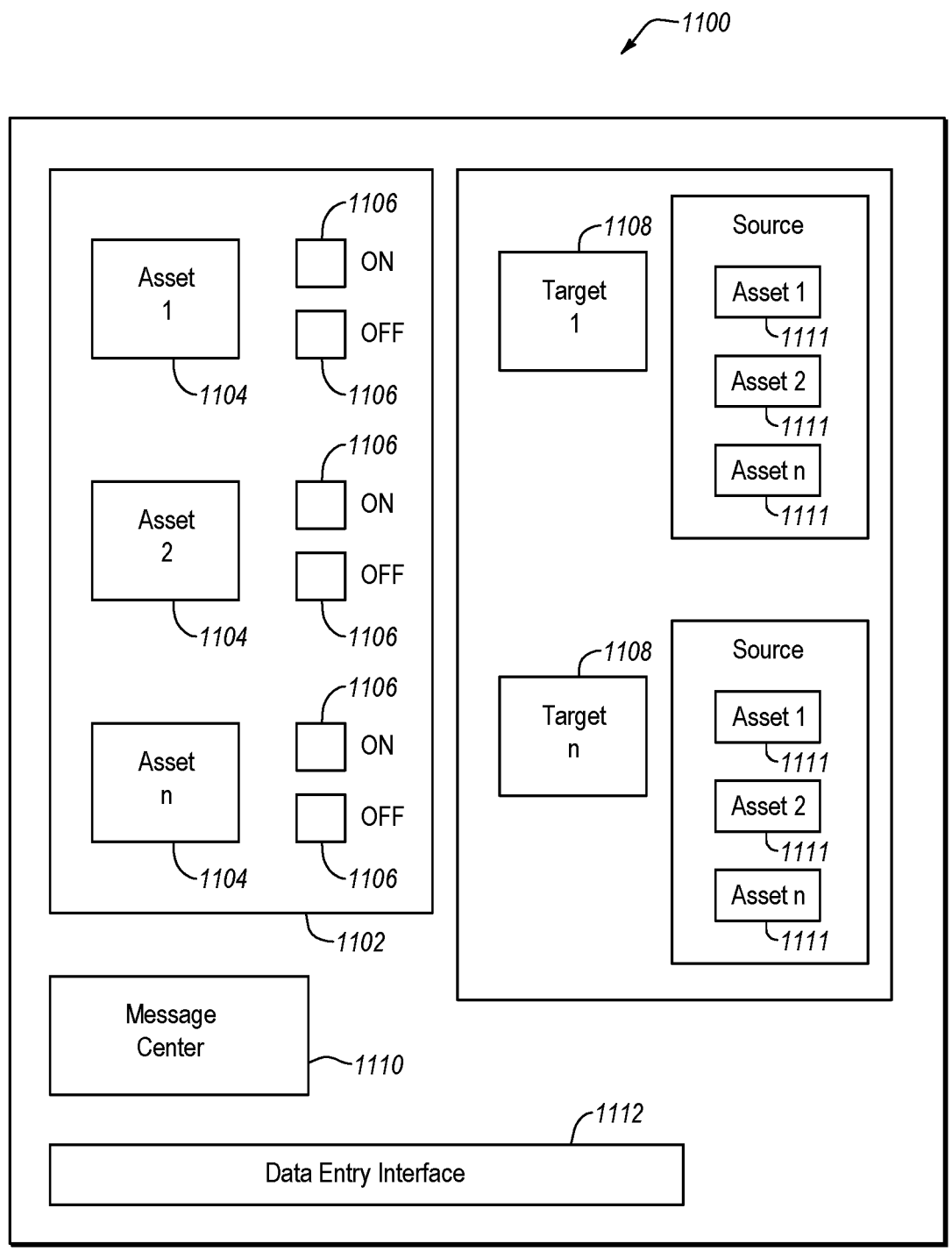
FIG. 5 is directed to an example UI.

With the discussion of FIGS. 1a-4 in view, attention is directed now to FIG. 5 which discloses a user interface (UI), one example of which is denoted generally at 1100. The UI can be part of, or separate from, the unified customer front-end (see, e.g., FIG. 3). The example UI can include an asset list 1102 which lists the data storage assets 1104 currently available for use, or in use. Each of the data storage assets 1104 can be associated with a pair of user-selectable elements 1106 which enable a user to designate the data storage asset 1104 as on-line or off-line. The asset list 1102 of the UI 1100 can be automatically updated when a new data storage asset is detected at the client, and when a data storage asset is removed from the client. Any such changes can be conveyed to a user by way of the message center 1110.

As well, the UI 1100 includes a list of one or more targets 1108 to which data from one or more data storage assets 1104 can be migrated. By definition, each of the targets 1108 includes excess data capacity that is available. In some embodiments, the particular amount of capacity available may be indicated for each target 1108. As well, a message to the user may be automatically generated indicating either that the target 1108 can accommodate the requested data migration, or cannot accommodate the requested data migration. The message can appear to, or otherwise be accessible by, the user in the message center 1110. Upon migration, the target 1108 can be displayed in the asset list 1102. The user can also designate the source 1111 of the data that is to be migrated to a particular target 1108. In one alternative embodiment, the list of targets 1108 can be combined with the asset list 1102.

Finally, the UI 1100 can include a data entry interface 1112. The data entry interface 1112 can take the form of text boxes, check boxes, a command line interface (CLI) and/or any other mechanisms that are configured to receive input from a user and convey that input to one or more hardware processors to carry out operations corresponding to the input received. As noted above, one example of such input is entry by the user of a Rack ID of a new data storage asset.

In view of this disclosure, it will be apparent that embodiments of the invention can provide a variety of advantages, although that is not required. One such advantage is that data storage capacity planning can be performed in real time as data is generated and streamed to a data analysis platform. As another example, embodiments of the invention can perform data storage capacity planning automatically without requiring specific initiation by a user. As a further example, data storage capacity planning can be performed on-the-fly as changes are made to the data storage associated with one or more clients. Further, a crowd-source approach to data storage capacity planning can be taken in which such planning spans, or at least takes into account, data storage capacity needs of multiple users. Finally, data storage assets can be readily identified that are well matched with projected further data storage needs.

G. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, switch, server, database, or storage node may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   receiving a client-generated data stream from a client;
   backing up the client-generated data stream to a cloud storage site;
   receiving, while the client-generated data stream is being backed up, a data metrics stream from the client, the data metrics stream including information concerning the client-generated data stream;
   receiving information concerning a current physical data storage capacity associated with the client;
   analyzing the received data metrics as the client-generated data stream is being backed up;
   generating a projected physical data storage capacity requirement for the client based on the analysis of the data metrics and based on the information concerning the current physical data storage capacity associated with the client; and
   based on the projected physical data storage capacity requirement, modifying the current physical data storage capacity of the client by adding or removing one or more physical storage devices to, or from, respectively, the client.

2. The method as recited in claim 1, wherein the data metrics stream is received in accordance with a data streaming protocol.

3. The method as recited in claim 1, wherein the data metrics stream is received from the cloud storage service.

4. The method as recited in claim 1, wherein the analyzing, generating, and identifying processes are performed automatically.

5. The method as recited in claim 1, wherein analyzing the received data metrics comprises analyzing the received data metrics whenever there is a change in the available physical data storage capacity of the client.

6. The method as recited in claim 1, wherein analysis of the data metrics is performed in real time as the data metrics stream is received.

7. The method as recited in claim 1, wherein the data metrics stream includes information concerning one or more of blocks, files, and objects.

8. The method as recited in claim 1, further comprising using results of the analysis as a basis for generating a projected physical data storage capacity requirement for another client.

9. A non-transitory storage medium having stored therein instructions that are executable by one or more hardware processors to perform operations comprising:
   receiving a client-generated data stream from a client;
   backing up the client-generated data stream to a cloud storage site;
   receiving, while the client-generated data stream is being backed up, a data metrics stream including information concerning the client-generated data stream;
   receiving information concerning a current physical data storage capacity associated with the client;
   analyzing the received data metrics as the client-generated data stream is being backed up;
   generating a projected physical data storage capacity requirement for the client based on the analysis of the data metrics and based on the information concerning the current physical data storage capacity associated with the client; and based on the projected physical storage capacity requirement, modifying the current physical data storage capacity of the client by adding or removing one or more physical storage devices to, or from, respectively, the client.

10. A non-transitory storage medium having stored therein instructions that are executable by one or more hardware processors to perform operations comprising:

transmitting a client data backup stream to a cloud storage platform;

generating a data metrics stream at a client, and one or more data metrics in the data metrics stream relate to client data in the client data backup stream;

transmitting the data metrics stream to the cloud storage platform;

transmitting information concerning a current physical data storage capacity of the client;

receiving information concerning a projected physical data storage capacity requirement for the client, wherein the information concerning the projected physical data storage capacity requirement for the client is based on an analysis of the data metrics stream;

transmitting, by way of a UI at the client, provisioning information to a vendor, and the provisioning information is based on based on the information received concerning projected physical data storage capacity requirement for the client and the information concerning the current physical storage capacity associated with the client; and modifying the physical data storage capacity of the client based on the information received concerning projected physical data storage capacity requirement for the client, and modifying the physical data storage capacity of the client comprises adding or removing one or more physical storage devices to, or from, respectively, the client.

11. The non-transitory storage medium as recited in claim 10, wherein the operations further comprise requesting analysis of the copy of the data metrics stream.

12. The non-transitory storage medium as recited in claim 10, wherein the operations further comprise transmitting information concerning a data migration from one node of the client to another node of the client.

13. The non-transitory storage medium as recited in claim 10, wherein the processes of transmitting the data metrics stream, transmitting information concerning a physical data storage capacity of the client, and receiving information concerning a projected physical data storage capacity requirement for the client, are all performed automatically.

14. The non-transitory storage medium as recited in claim 10, wherein the processes of generating a data metrics stream, transmitting the data metrics stream, and transmitting information concerning a physical data storage capacity of the client are continuously performed as data is being generated at the client.

15. The non-transitory storage medium as recited in claim 10, wherein the operations further comprise displaying, at the client, a list of data storage assets associated with the client.

16. The non-transitory storage medium as recited in claim 10, wherein the operations further comprise receiving user input by way of a GUI, the user input concerning data storage assets associated with the client.

17. The non-transitory storage medium as recited in claim 10, wherein the operations further comprise generating another data metrics stream at the client, wherein the data metrics stream and the another data metrics stream are associated with different respective nodes of the client.

18. The non-transitory storage medium as recited in claim 9, wherein the physical data storage of the client resides at a client site.

19. The non-transitory storage medium as recited in claim 9, wherein the physical data storage of the client resides at a datacenter.

* * * * *